(12) United States Patent
Majid

(10) Patent No.: US 9,100,615 B2
(45) Date of Patent: Aug. 4, 2015

(54) ON-SCREEN DISPLAY OF INPUT SOURCES WITH POSITION-BASED ARRANGEMENT

(71) Applicant: BBY Solutions, Inc., Richfield, MN (US)

(72) Inventor: Mahmood Majid, Lakeville, MN (US)

(73) Assignee: BBY Solutions, Inc., Richfield, MN (US)

( * ) Notice: Subject to any disclaimer, the term of this patent is extended or adjusted under 35 U.S.C. 154(b) by 0 days.

(21) Appl. No.: 13/910,665

(22) Filed: Jun. 5, 2013

(65) Prior Publication Data

US 2014/0362294 A1    Dec. 11, 2014

(51) Int. Cl.
| | |
|---|---|
| *H04N 5/445* | (2011.01) |
| *H04N 5/45* | (2011.01) |
| *H04N 5/50* | (2006.01) |
| *H04N 7/00* | (2011.01) |
| *H04N 11/00* | (2006.01) |
| *G06T 13/00* | (2011.01) |
| *H04N 21/41* | (2011.01) |
| *H04N 21/431* | (2011.01) |
| *H04N 21/436* | (2011.01) |
| *H04N 21/4363* | (2011.01) |
| *H04N 21/442* | (2011.01) |
| *H04N 21/462* | (2011.01) |
| *H04N 21/485* | (2011.01) |
| H04N 21/422 | (2011.01) |

(52) U.S. Cl.
CPC ........... *H04N 5/445* (2013.01); *H04N 21/4108* (2013.01); *H04N 21/4312* (2013.01); *H04N 21/4363* (2013.01); *H04N 21/43615* (2013.01); *H04N 21/44227* (2013.01); *H04N 21/4622* (2013.01); *H04N 21/485* (2013.01); *H04N 21/42221* (2013.01)

(58) Field of Classification Search
CPC . H04N 5/45; H04N 5/44513; H04N 5/44504; H04N 5/445; H04N 21/4108; H04N 21/4312; H04N 21/485; H04N 21/4363; H04N 21/44227; H04N 21/4622; H04N 21/43615
See application file for complete search history.

(56) References Cited

U.S. PATENT DOCUMENTS

| | | | |
|---|---|---|---|
| 7,043,691 B1 * | 5/2006 | Kwon et al. | 715/705 |
| 8,009,234 B2 * | 8/2011 | Lee et al. | 348/706 |
| 2001/0052946 A1 * | 12/2001 | Sato | 348/706 |
| 2004/0155982 A1 * | 8/2004 | Jeong | 348/565 |
| 2006/0085568 A1 * | 4/2006 | Lee et al. | 710/15 |
| 2009/0201420 A1 * | 8/2009 | Brown et al. | 348/552 |

(Continued)

*Primary Examiner* — Jefferey Harold
*Assistant Examiner* — Sean Haiem
(74) *Attorney, Agent, or Firm* — Schwegman Lundberg & Woessner, P.A.

(57) ABSTRACT

On-screen display techniques and configurations for audiovisual content input selection and indications in a television, monitor, receiver, or other electronic display device are described herein. An on-screen user interface of a display device may be enhanced with on-screen indications that indicate the position of the respective audiovisual content. For example, a user interface may provide an arrow in the lower-left portion of the screen to correspond to audiovisual input obtained from a device connected to the lower-left portion of the display device housing. A listing of input sources arranged by position relative to the display device and appropriate previews of the audiovisual content from the sources may also be incorporated into the user interface. In further examples, determined labels and human-readable identifiers for the respective input sources may be coordinated with the listing of input sources arranged by position.

20 Claims, 6 Drawing Sheets

(56) References Cited

U.S. PATENT DOCUMENTS

| | | | |
|---|---|---|---|
| 2012/0127181 A1* | 5/2012 | Fujimoto et al. | 345/473 |
| 2012/0162523 A1* | 6/2012 | Bastide et al. | 348/569 |
| 2013/0038793 A1* | 2/2013 | Yoshida et al. | 348/552 |
| 2013/0083243 A1* | 4/2013 | Freund et al. | 348/565 |

* cited by examiner

ON-SCREEN DISPLAY OF INPUT SOURCES WITH POSITION-BASED ARRANGEMENT

TECHNICAL FIELD

Embodiments pertain to on-screen user interface displays provided in electronic display outputs. Some embodiments relate to on-screen user interface displays provided for consumer electronic display devices, such as televisions, monitors, and the like.

BACKGROUND

Electronic display devices such as televisions, monitors, video receivers, and projectors often provide switchable multiple digital and analog input ports. The signal from a particular audio/video input port may be selected to output a particular audio/video signal by the electronic display device. No overall industry-standard exists to specify the type, location, or configuration of the audio/video input jacks, receptacles, ports, and like inputs on the electronic devices. Rather, the type and configuration of the audio/video inputs varies depending on the designated features of the display device, hardware capabilities of the display device, and other factors such as costs or design considerations.

Different brands and types of models of display devices within a same brand may provide varying layouts and inputs, as well as different user interfaces to switch between input sources. While newer technologies such as High-Definition Multimedia Interface (HDMI), Digital Visual Interface (DVI), and DisplayPort attempt to provide uniform digital input interfaces for audiovisual content, locations of the respective input sources may be unknown to users. A user may not know that a particular input port (e.g., 'HDMI 2', one of four HDMI ports located on the back of a television) corresponds to a specific audiovisual output device (e.g., video output from a cable box). Often, a skilled user needs to learn and memorize the input source locations, including the number and position of the respective input ports, to select and display the correct audiovisual content. In addition, once a display device is mounted on a wall, for example, the user may not know which input on the back of the display device is in use or corresponds to a particular audiovisual source.

DETAILED DESCRIPTION

Figure 1:
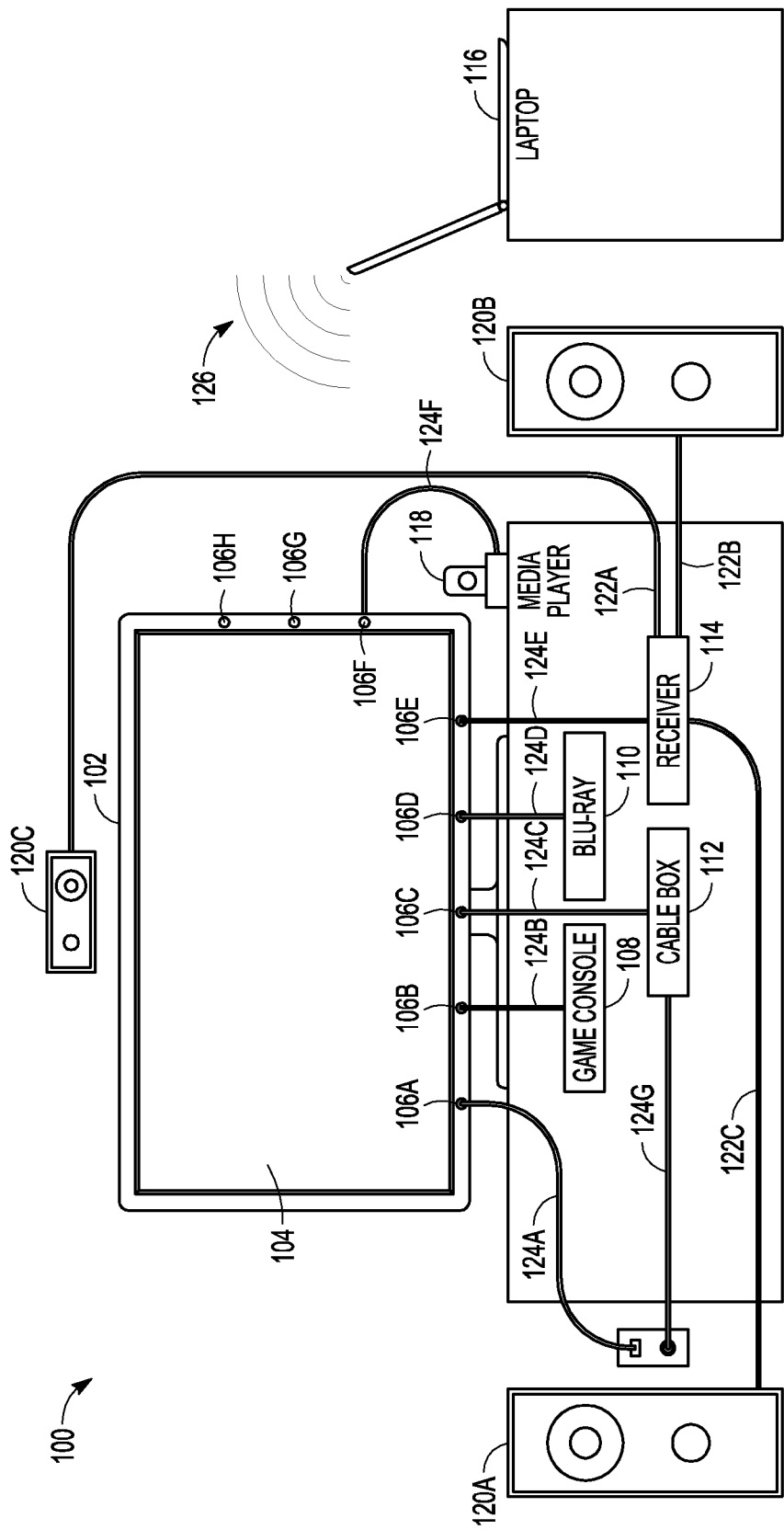
FIG. 1 illustrates an example entertainment device system connected with multiple audiovisual output devices in connection with an example further described herein.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some of the embodiments described herein describe improved on-screen display interfaces used for the display and selection of audiovisual content for audiovisual content sources and targets. These display interfaces include menus and graphical mechanisms that can provide a user with an indication of audiovisual inputs and outputs in a simplified and easy-to-understand manner. These display interfaces further include mechanisms to convey an easy-to-understand status and location of a particular audiovisual source or target on an electronic display device. Such display interfaces may be used to assist with initial connection of respective audiovisual sources, as well as the selection of respective audiovisual sources once the audiovisual sources are connected.

With existing display devices such as televisions and monitors, an input source is typically selected by the user from a circular list of inputs. An input source may be selected either by activating an "input" button or remote control command, or scrolling through a list of inputs often arranged alphabetically. With a list of inputs, there is often no immediate discernible difference between inputs such as 'Component 1', 'Component 2', 'HDMI 1', 'HDMI 2', 'HDMI 3', and 'HDMI 4'. The user is often forced to view multiple of the generically-named sources to locate and switch to the desired content. Further, the list of inputs is not correlated to the location or positioning of the physical inputs on the display device.

Once the audiovisual sources are connected to the input port of a display device (for example, to the rear of a television), there is no way to easily determine which source is connected to a particular input without electronically accessing the input. Some newer models of televisions and monitors allow a user to assign a custom name to input jacks and ports, but such names often need to be manually programmed, and do not properly handle cases where the input source is disconnected, moved, or replaced. Likewise, a user may not know which specific jack or port is already in use when the user desires to connect a new device to an unknown input port of the display device.

In some examples, an on-screen display interface is adapted to include one or more graphical indications that indicate an active input on a display screen using a directional, positional, or other location-related mechanism. For example, a newly-activated input port located on a lower, left side of a display screen housing may be indicated by an on-screen indication displayed on the lower, left side of the on-screen display. As another example, an on-screen indication for an input source connected to the right side port of the display device housing may be generated for display in the right side of the display output when a device is connected to the right side port, or when specific audiovisual content becomes available or changes via the connection of the right side port.

The directional and positional characteristics of input indications in the on-screen interface may assist a user with establishing new connections to audiovisual source devices. For example, the on-screen display interface may provide a mapping of respective input ports on the sides and rear of a display device. This on-screen display interface may easily indicate a layout of ports to display which ports are unconnected to any devices, which ports are connected to other devices, which ports are receiving an active signal, and the like. Such layout information may assist a user with establishing a connection when the device is mounted to a wall or has visually inaccessible input ports.

In further examples, the location of the on-screen indications for the respective display inputs may be correlated to the position of content source devices as connected to the display device, correlated to a position within the room surrounding a display screen of the display device, or correlated to a position of objects within the surrounding environment of the display screen. For example, an audiovisual content device that is connected to the right side of the television may be correlated to an indication that appears on the right side of the display output. An audiovisual content device that is connected to an input port on the back of the television but is located substantially below the television from the perspective of the user may be correlated to an indication that appears on the bottom of the screen. A designation of the location of different devices may be queried from the user using a setup wizard or other selection mechanism. Automated mechanisms may also be used to determine the location of the audiovisual source.

FIG. 1 provides an illustration of an example media playback system 100 (located in an environment such as a consumer living room) including a display device 102 and multiple connected input sources. As shown, the display device 102 includes a display screen 104 for projecting a video display to a viewing user while the display device 102 is positioned on a stand, positioned on a wall, or located in another suitable location for human viewing. The respective input sources may be located at different directions relative to the perspective of the viewing user and relative to the location of the display device inputs. For example, some input sources are located to the left of the screen, some input sources are located below the screen, and some input sources are located to the right of the screen.

The respective input sources are illustrated as including a gaming console 108 connected to port 106b via connection(s) 124b, a cable box 112 connected to port 106c via connection(s) 124c, an optical media player 110 (e.g., a Blu-ray player) connected to port 106d via connection(s) 124d, a laptop 116 streaming audiovisual content (e.g., streamed from an internet-based source) via wireless network connection(s) 126, and a personal media player 118 connected to port 106f via connection 124f. The display device 102 is also illustrated as being connected to a wired network via an Ethernet cable 124a connected to port 106a, and the cable box 112 is also illustrated as being connected to a cable network via cable connection 124g. The outputs of the media playback system 100 include a display screen 104 located in a housing of the display device 102, an audiovisual (A/V) receiver 114 connected to the port 106e of display device 102 via connection(s) 124e, and audio speakers 120a, 120b, 120c connected to the A/V receiver 114 via cables 122c, 122b, 122a. The display device 102 also includes additional ports 106g, 106h that are not connected to any other input/output device or peripheral.

The input and output sources may be connected to the display device 102 and with the other devices of the media playback system 100 using any number of wired analog or digital connections and links, including coaxial, component, composite, RGB, S-video, optical (e.g., TOSLINK), HDMI, DVI, DisplayPort, Universal Serial Bus (USB), and IEEE 1394 (Firewire) cables and similar connection mediums. The input and output sources may also be connected to the display device 102 and with the other devices of the media playback system 100 using any number of wireless communication standards over respective wireless mediums, including Bluetooth, IEEE 802.11a/b/g/n/ac (Wi-Fi), 3GPP Long Term Evolution/Long Term Evolution-Advanced (LTE/LTE-A), IEEE 802.16 (WiMAX), WirelessHD, Wi-Fi Direct, Wireless Home Digital Interface (WHDI), Digital Living Network Alliance (DLNA), Digital Audio Access Protocol (DAAP), Universal Plug and Play (UPnP), infrared (IR), radio frequency (RF), and the like communications which may be defined according to respective standards families and standards groups.

The input and outputs of the various devices operating in the media playback system 100 are configured to interface with various ports 106a, 106b, 106c, 106d, 106e, 106f (and, as applicable, 106g, 106h) of the display device 102. The multiple input receptacles, ports, jacks, and other connectors used to facilitate the connections 124a, 124b, 124c, 124d, 124e, 124f may correspond to different types of connectors, form factors, signal mediums, signal formats, and device or cable couplings. Input sources for the display device 102 may include any number of devices generating an electronic signal for audiovisual playback as an input to the display device 102. The input sources may also include audiovisual content received from media storage, media players, portable media devices, and other media delivery mechanisms. The media content may also be provided as media files stored on memory cards and storage, and the display device 102 may include software applications and playback codes to directly decode and playback the media files.

Figure 2:
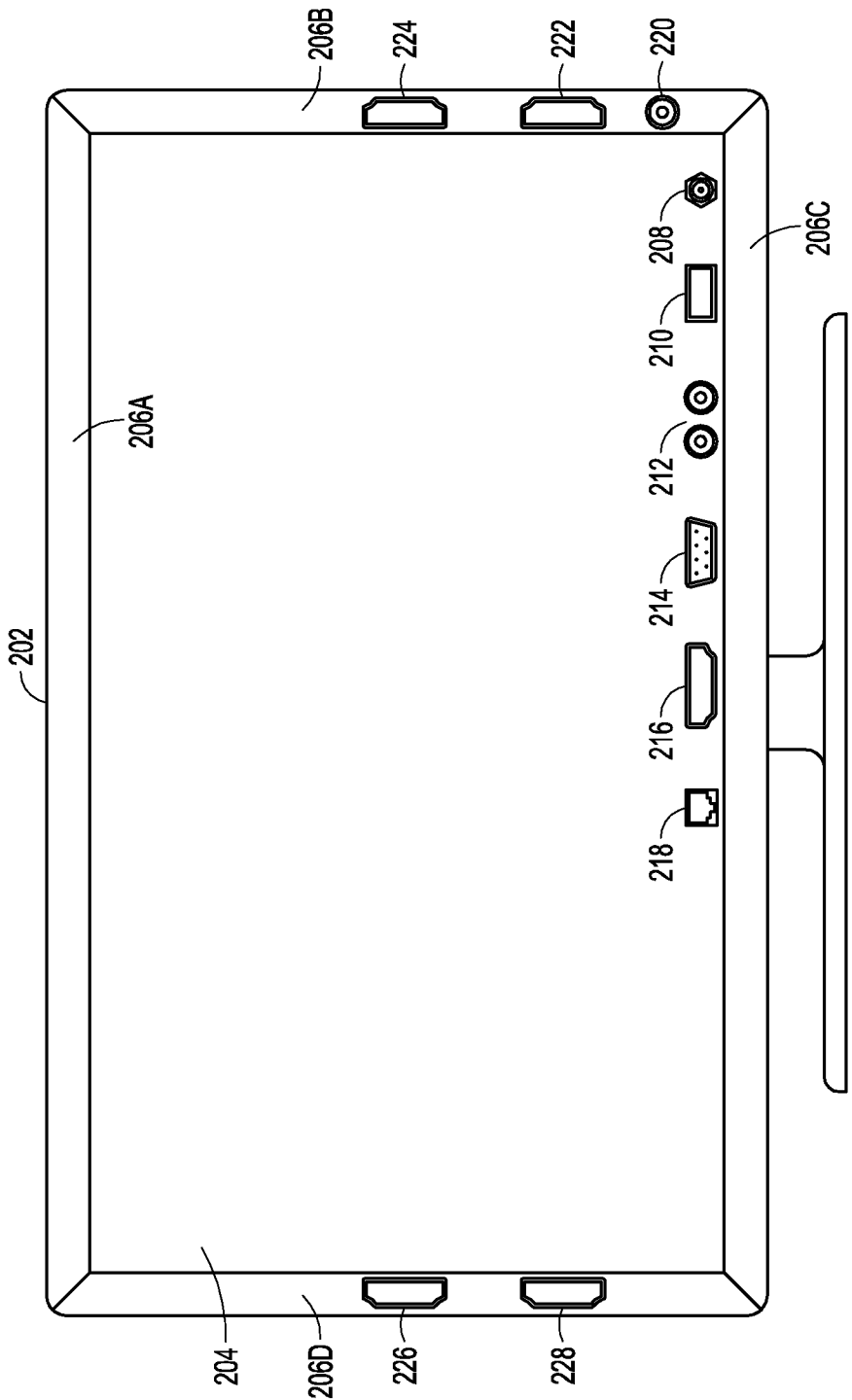
FIG. 2 illustrates an electronic display device having multiple audiovisual input connectors in connection with an example further described herein.

FIG. 2 provides an illustration of a television display device 202 illustrating input/output ports available for connection on the television display device 202. The television display device 202 includes input/output ports that are disposed on the back panel 204 of the television display device 202, and also disposed on the frame of the display device 202 (such as on the top frame 206A, a first side frame 206B, a bottom frame 206C, or a second side frame 206D).

As shown in FIG. 2, the television display device 202 includes a series of input receptacles and ports arranged on the back panel 204, including a coaxial video port 208 configured for connection with a coaxial cable, a USB port 210 configured for connection with a USB cable, a RCA-composite video port 212 configured for connection with an RCA-type composite cable, a VGA port 214 configured for connection with a VGA/SVGA-type cable, a first HDMI port 216 configured for connection with an HDMI cable, and a Ethernet/RJ-45 port 218 configured for connection with a RJ-45 CAT5/CAT6 cable. As also shown on FIG. 2, the first side frame 206B also includes a second HDMI port 222 and a third HDMI port 224 configured for connection with respective HDMI cables, and a digital audio port 220 configured for connection with a digital audio cable. As also shown on FIG. 2, the second side frame 206D also includes a fourth HDMI port 226 and a fifth HDMI port 228 configured for connection with respective HDMI cables.

Some of the inputs and outputs to the television display device 202 may be provided using a wired connection (via a connection cable, such as an HDMI cable, with any of the HDMI ports 216, 222, 224, 226, 228 as illustrated), whereas other of the sources may be provided from direct coupling with the display device (such as a solid state media reader port, not shown) or with a wireless connection (such as from a wireless local area network (LAN) or peer-to-peer connection, not shown).

Figure 3:
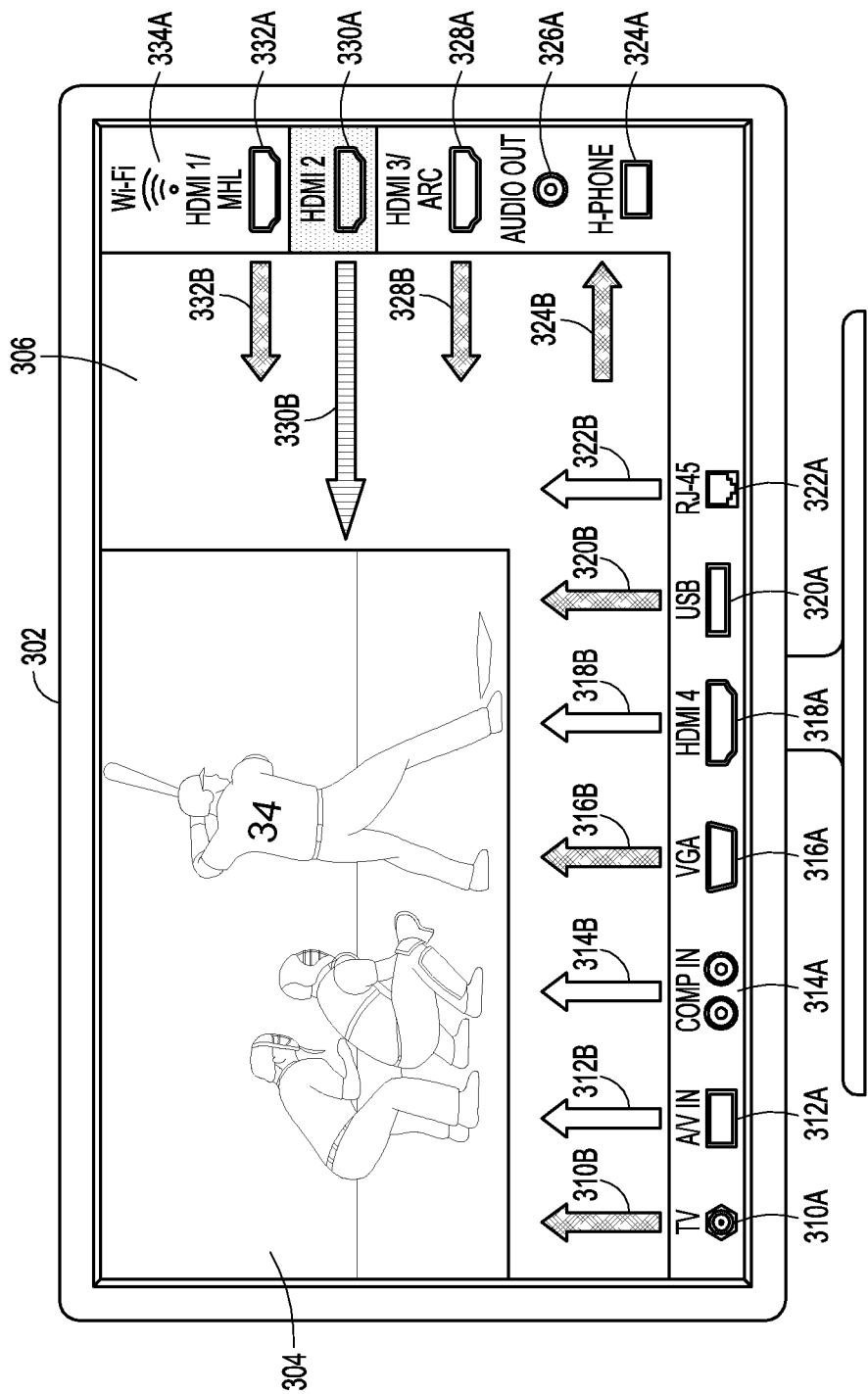
FIG. 3 illustrates a graphical user interface configured for selecting an audiovisual input source using a picture-in-picture display in connection with an example further described herein.

FIG. 3 provides an illustration of a user interface of a display device 302 configured for selecting an audiovisual input source using a picture-in-picture display 304 and input selection display 306. As shown, the user interface includes multiple designations of the available input ports and sources connected to the display device 302, along with indications of the position of the input ports and sources. These designations provide a simple-to-understand view of available ports, connected ports, and active ports, as well as the location of such ports relative to the display output.

As shown, the picture-in-picture display 304 is configured to provide a preview of a selected audiovisual input source while displaying a geometrically arranged display of the respective audiovisual inputs. In particular, the picture-in-picture display 304 is designated to provide a preview of content received via a port labeled 'HDMI 2', that is accompanied by an indication 330A of an active input selection (e.g., a shaded box surrounding the indication 330A). The picture-in-picture display 304 is further designated with use of an arrow 330B which designates the selection of content in the picture-in-picture display 304 received from the input port.

The input selection display 306 includes a set of indications for available input and outputs of the display device 302. The geometric arrangement of the set of indications in the on-screen display may correspond to the location of the respective audiovisual inputs directly on, or relative to, the display device 302 (or a display screen outputting a display output generated from the display device 302). From this geometric arrangement, a user can easily select and choose the appropriate device or device connection by location of the input port. A user may also determine the location of a particular input port or receptacle on another area of the display device 302 (such as the sides or rear of the display device). Further, the input selection display 306 may indicate whether a particular input port or receptacle is inactive or is receiving an active signal, or whether a particular input port or receptacle is connected to a cable or another device.

FIG. 3 also provides an example of on-screen indications for respective input sources, with statuses of the respective input ports of the display device 302 that are also displayed in the input selection display 306. The input selection display 306 includes: a text and symbol indication 310A representing a TV tuner input source, accompanied by a colored arrow 310B indicating that the source is active and available; a text and symbol indication 312A representing an audiovisual input source, accompanied by a uncolored arrow 312B indicating that the source is inactive; a text and symbol indication 314A representing a composite input source, accompanied by a uncolored arrow 314B indicating that the source is inactive; a text and symbol indication 316A representing a VGA input source, accompanied by a colored arrow 316B indicating that the source is active and available; a text and symbol indication 318A representing an HDMI input source, accompanied by a uncolored arrow 318B indicating that the source is inactive; a text and symbol indication 320A representing a USB input source, accompanied by a colored arrow 320B indicating that the source is active and available; a text and symbol indication 322A representing a RJ-45/Ethernet input source, accompanied by an uncolored arrow 322B representing that the source is inactive.

The side of the input selection display 306 includes: a text and symbol indication 324A accompanied by a colored arrow 324B representing that output data is being transmitted to a headphone port; a text and symbol indication 326A representing a digital audio output port; a text and symbol indication 328A representing an HDMI port, accompanied by a colored arrow 328B representing that the source is active and available; the text and symbol indication 330A representing an HDMI port, accompanied by the colored arrow 330B representing that the picture-in-picture display 304 originates from the HDMI input port; a text and symbol indication 332A representing an HDMI port, accompanied by an arrow 332B indicating that the source is active and available; and a text and symbol indication 334A indicating that a Wi-Fi content source is selectable.

The previously displayed audiovisual content from a previously selected input source can be hidden, placed in the background of the input selection display 306, or resized automatically for viewing in the picture-in-picture display 304 upon user command to enter an input selection mode. The preview provided in the picture-in-picture display 304 may switch according to user selections and designations (e.g., updating as the user switches from one source to another, such as HDMI 2 to HDMI 1). In other examples, a newly connected audiovisual source may automatically switch to a picture-in-picture display with a designation of the newly connected audiovisual source. Other mechanisms to provide a quick preview of different input sources may also be displayed within the input selection screen 306 and picture-in-picture display 304.

The on-screen indications used for the input sources as described herein may be provided from any number of display features. These may include animations, text, symbols, lights, and content previews, as well as non-visual indications such as sounds or tactile feedback, and the activation of other devices. For example, as an input connected to a port on the lower right of the television screen becomes activated, an arrow directed towards the location and position of the input source (relative to the position of the television screen from the perspective of a viewing user) may easily inform the viewing user of the new input that he or she may wish to select. As another example, as an input menu is selected, an on-screen indication may display all available inputs with a placement of respective selection mechanisms corresponding to a location of the input relative to the direction of the respective input port or receptacle on the display device.

The on-screen indications described herein may also indicate other characteristics of the audiovisual input. In addition to conveying a location-related characteristic of the input source, an on-screen indication may directly or indirectly indicate whether the input source is active, new, has recently become active, or whether the input content has changed. The on-screen indication may also indicate one or more characteristics of the content itself. For example, high-definition video content may be indicated with an on-screen indication that has a different color than standard-definition video content. The on-screen display may include any number of indications to provide a single, unified display of multiple characteristics of the inputs, and enable a user to quickly determine and select the appropriate input source.

The on-screen indications for the respective audiovisual sources may be customized to provide status information to users. Colors may be applied to the respective indications to designate a status of an audiovisual input. For example, a color such as green may designate a currently selected/previewed input port; a color such as yellow may designate all active input ports available for selection; a color such as white may designate connected ports where the audiovisual source device is powered off; and a color such as gray may designate inactive input ports not available for selection. In addition, a text color of a respective port label can be changed to highlight the active connection or changes in input port connections.

Figure 4:
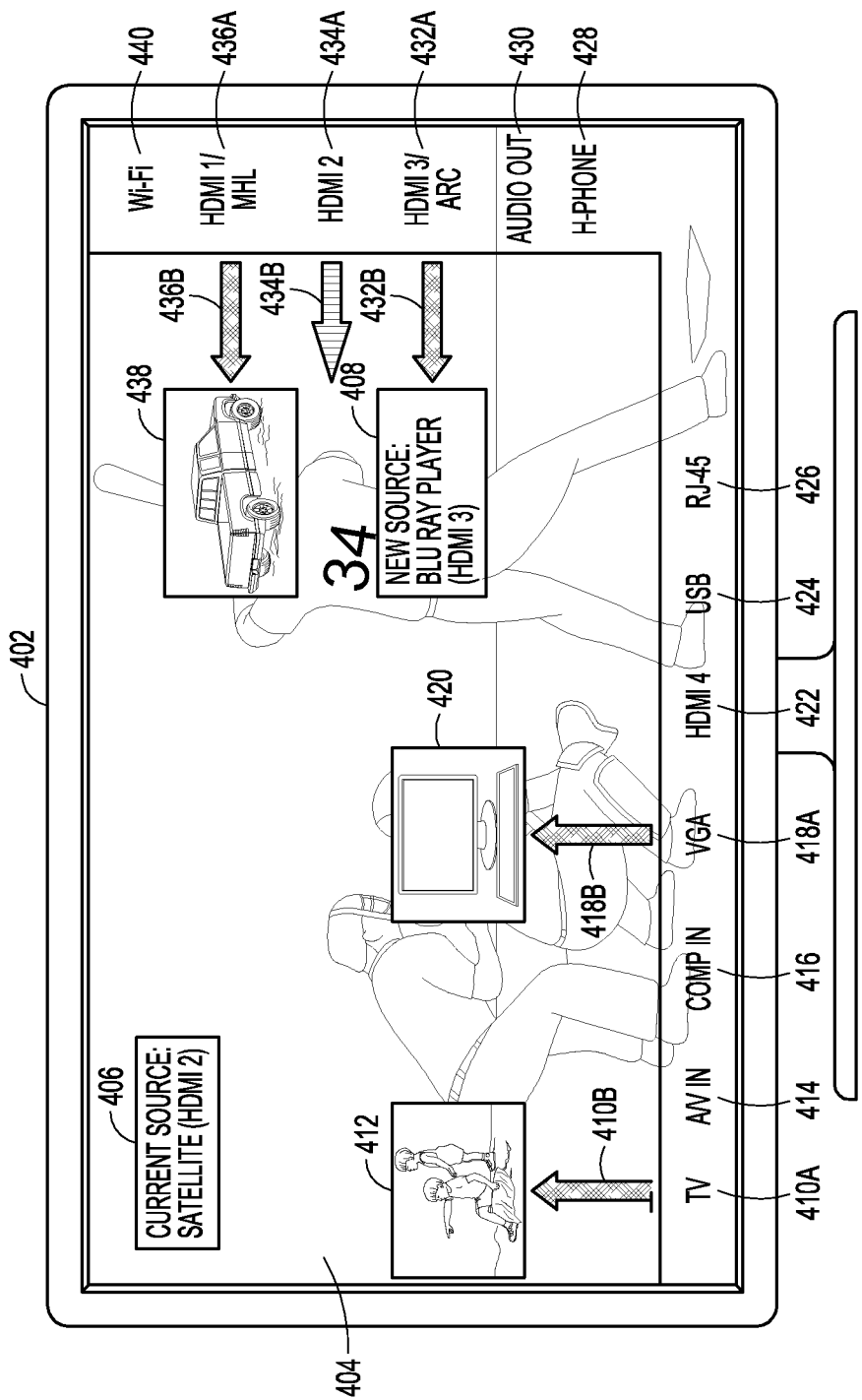
FIG. 4 illustrates a graphical user interface configured for selecting an audiovisual input source in connection with an example further described herein.

FIG. 4 provides an illustration of a user interface of a display device 402, with the user interface configured for enabling user selection of an audiovisual input source using overlaid information of multiple audiovisual input sources. The display device 402 includes a video display 404 provided from an on-screen user interface used to select and indicate the status of the respective multiple audiovisual input sources. The video display is further configured for showing the availability of multiple input sources at a single time as an overlay to an active audiovisual source. In the example of FIG. 4, the video display 404 overlays the user interface over the active audiovisual source with a series of input source indications and previews.

The indications provided within the video display 404 include an active input source indication 406 (e.g., a label indicating that the current source is "HDMI 2" with a known "Satellite" label), a new input source indication 408 (indicating that a new source is "HDMI 3" known as the "Blu Ray Player" and is now connected to the display device 402), an active preview 412 of content received from a "TV" tuner input, a designation of content 420 from a "VGA" input, and an active preview 438 of content received from a "HDMI 1" input. The indications are accompanied by respective arrows pointing from display indication text labels (e.g., 410A, 418A, 432A, 434A, 436A) to the active previews and designations of content.

Names of the respective input and output sources are provided in selectable indications arranged according to the position of the input/output source. As shown, a selectable indication 410A is labeled "TV" to correspond to a TV tuner located at that position on the rear of the display device 402, and is accompanied by an arrow 410B pointing to video content in the active preview 412; a selectable indication 414 is labeled "A/V" to correspond to a RCA composite input located at that position on the rear of the display device 402; a selectable indication 416 is labeled "COMP IN" to correspond to a component input located at that position on the rear of the display device 402; a selectable indication 418A is labeled "VGA" to correspond to a VGA/SVGA input located at that position on the rear of the display device 402 and is accompanied by an arrow 418B pointing to the designation of content 420; a selectable indication 422 is labeled "HDMI 4" to correspond to a HDMI input located at that position on the rear of the display device 402; a selectable indication 424 is labeled "USB" to correspond to a USB port located at that position on the rear of the display device 402; and a selectable indication 426 is labeled "RJ-45" to correspond to an Ethernet/RJ-45 port located at that position on the rear of the display device 402.

Likewise, a selectable indication labeled: "H-Phone" 428 corresponds to a headphone output located approximately at that position on the side of the display device 402; "Audio Out" 430 corresponds to a digital audio output located approximately at that position; "HDMI 3" 432A corresponds to an HDMI output located approximately at that position (which is newly activated as a source, again as designated by arrow 432B and the new input source indication 408); "HDMI 2" 434A corresponds to an HDMI input located approximately at that position (which is designated by arrow 434B and input source indication 406 as being displayed on screen); "HDMI 1" 436A corresponds to an HDMI input located approximately at that position (which is designated by arrow 436B and the active preview 438 of content available from the source); "Wi-Fi" 440 corresponds to another input or sets of inputs that are available, for example, from Wi-Fi streaming (not necessarily located at that position on the device, however).

In some examples, the display device 402 may use one or multiple tuners to provide a real-time or near-real-time preview of content from the respective input sources (such as the previews provided in previews 412, 420, 408, 438). For example, rather than requiring a user to manually select an entirely new input or launch a picture-in-picture display, a small preview of content obtained every n milliseconds or m seconds might be overlaid on the on-screen display using the previews.

A user may select a particular input port for preview or display in the video display 404 using commands transmitted from a remote control. For example, the on-screen display may be configured to enable a user to control the interface with remote control navigation keys (such as up, down, left, right) to select a different port with use of ENTER or other suitable selector. As a result, video content can become displayed in a small picture-in-picture window within the graphical on-screen display (such as the previews 412, 420, 408, 438 in FIG. 4) or in a larger picture-in-picture window (such as the picture-in-picture display 304 in FIG. 3). If ENTER or another selector is not pressed, the on-screen display and the picture-in-picture window may disappear and become replaced by the previous input display.

Other remote control navigation keys such as a singular "INPUT" button may be pushed by a user a suitable number of times to cycle through the available inputs. The on-screen input selection menu may also be integrated into other types of on-screen interface controls. Additionally, device buttons, software applications, and other selectable user interface mechanisms may enable selection and control of an input switch command.

The names and types of the inputs illustrated for the input ports and sources depicted in FIGS. 2, 3, and 4 are provided for purposes of illustration and not limitation. For example, other descriptive names, text, or audiovisual labels may be applied to indicate the input source. Likewise, the types and format of the symbols and indications such as arrows depicted in FIGS. 3 and 4 are provided for purposes of illustration and not limitation.

In a further example, automated or user-assisted techniques may be used to assign relevant labels and names to the input sources and input ports provided in the on-screen display. For example, data may be digitally obtained from the source to correlate a specific label or name to an identified device, such as a device identified with use of a HDMI Consumer Electronics Control (CEC) data transfer. HDMI CEC provides a specification for command of devices over HDMI cable.

The HDMI CEC specification enables source devices to provide a device ID code that can be parsed by the display device to identify the device and correlate the identified device to some name. A suitable name or device type for a device ID code can be determined and designated automatically with the display device. For example, the names of each device connected to a television via a HDMI cable may be detected and recorded for further use in the on-screen display and display device user interface. The names assigned to the respective devices may originate from a built-in library of device types, a downloaded list of device types, downloaded device information, or other automated mechanisms.

In other examples, the name of the input source used in the on-screen display may be obtained from the audiovisual content itself to indicate the name or representation of the input source or the input content available on the source. For example, digital data may be extracted from the characteristics of the content (e.g., high-definition video, music, photos, and the like) to display a specific indication of the available content. This digital data may also originate from metadata associated with audiovisual content itself. The information obtained for the content or the content source may be correlated to some display or indication of the particular input port in the on-screen display and display device user interface.

Figure 5:
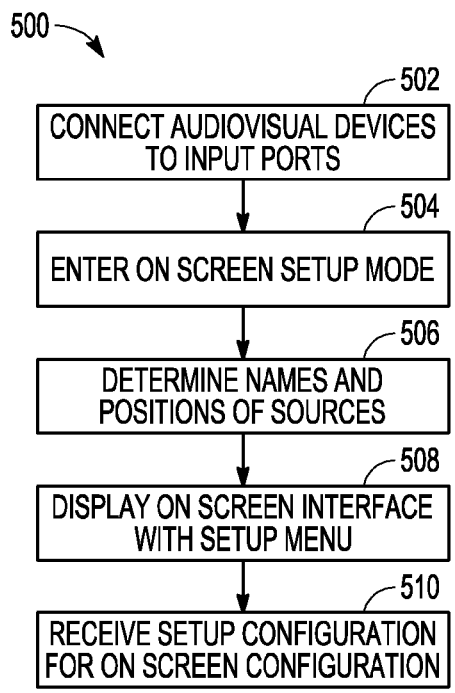
FIG. 5 illustrates a flowchart of a setup-based input selection process implemented within an electronic display device in connection with an example further described herein.

FIG. 5 provides an illustration of a flowchart 500 for an initial input selection process performed with an initial setup of the display device according to an example. This initial setup may be initiated by a connection of a new input/output device or peripheral, a device start-up procedure, user selection of a setup mechanism, or like setup designation.

First, the user connects the audiovisual content sources to the input ports of the display device (operation 502). These sources may include audiovisual content provided from source devices such as a cable/set top box, a Blu-ray player, a DVD player, a personal computer (PC), or content sources such as an antenna, cable network, Internet/local area network connection, or wireless personal area/local area/wide area network. Next, the display device can enter the on-screen set up mode (operation 504). The user interface may also provide a set up mechanism, using a wizard, options menu, or like interface, to establish parameters of the input connections. This may include specifying the names of various devices, specifying preferences for the on screen input display, specifying locations of various devices and ports, and the like.

The television, with automated mechanisms and potentially with assistance from the user, may determine the names, positions, and other information related to the various audiovisual input sources and ports (operation 506). The positions may be factory programmed to correspond to the known specifications of the display device. In other examples, the information may be obtained from the internet with a network connection. The user also may be asked to select a particular model or configuration, indicate the location of the input sources and ports, and indicate user preferences for the on-screen display.

The on-screen display interface may be displayed during the setup mode (operation 508) to indicate the status of various connections, and potentially active/inactive statuses of the connections. For example, the user may press the INPUT button or key to see graphically which devices are already successfully connected. With the on-screen display, the display can help the user establish and set up appropriate connections to external devices, and locate available or inactive ports on the display device.

As appropriate, the setup configuration for the input on-screen display will be displayed to the user, as the display device receives the setup configuration for the on-screen configuration (operation 510). The setup configuration may be used for phone analysis and to offer user help with customer support agents, for example, guiding the customers for establishing correct connections and cable wires. The on-screen display may then guide users to establish connections with new devices, and indicate when the connection is successfully established.

Figure 6:
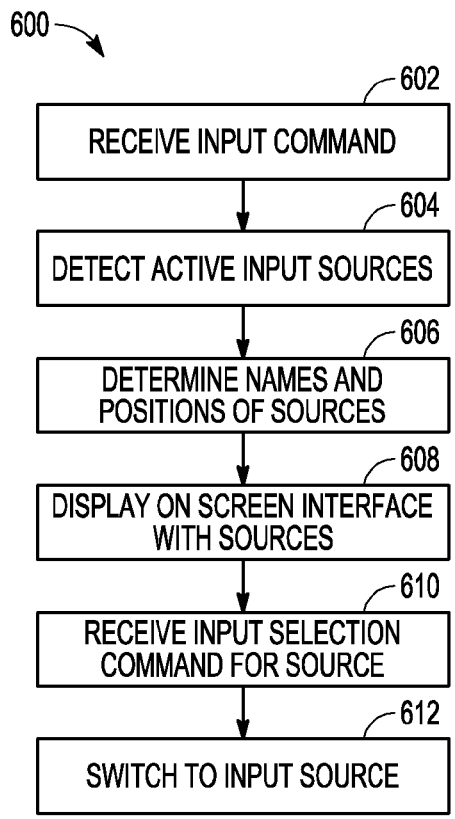
FIG. 6 illustrates a flowchart of an input selection process implemented within an electronic display device in connection with an example further described herein.

FIG. 6 provides an illustration of a flowchart 600 of an input selection process for an electronic display device. Whereas the operations of flowchart 500 were provided with example for the establishment of new connections and the setup of the on-screen interface, the flowchart 600 indicates use of the on-screen display as a selection for already-connected inputs and outputs.

As shown, the input selection process is initiated by the receipt of an input selection command (operation 602), such as with the depression of a dedicated input button or selection of an input option in a graphical user interface. The input selection process further performs operations to provide information to the user. These operations include detecting active input sources (operation 604) to indicate input source activity to the user; and determining names and positions of sources (operation 606). In some examples, this information may be reviewed and confirmed by the user.

The information obtained for the on-screen display is then provided within a display of the on-screen interface (operation 608). Here, the on-screen display provides an indication of pertinent information to the selection on the on-screen input selection. This may include information for which of the input sources are active, information for the position of the input ports or receptacles, and other information relevant to the display of content from one or more of the input sources.

With the on-screen display, the display device can receive an input selection command for a particular source (operation 610). Upon receipt of the input selection command, the display device can then switch to the particular input source (operation 612). In further examples, content from multiple inputs may be displayed simultaneously with use of picture in picture or overlaid video, until the user selects a particular input source. Other selection mechanisms for electronic user interfaces may be integrated into the input selection command. In further examples, the preceding operations may also apply to the selection of output ports in connection with the activation and control of audiovisual content output from the display device.

In some examples, switching to a particular input source is accompanied by commands to control the display of the audiovisual content. For example, if the input device is turned off, the display device may send a command (e.g., via HDMI CEC) to power up the device. Likewise, if the audiovisual content from the input device is paused or inactive, the display device may send a command to resume or play the content. A similar command may be sent to the previously selected input source to stop or pause playback, power off, and the like.

Figure 7:
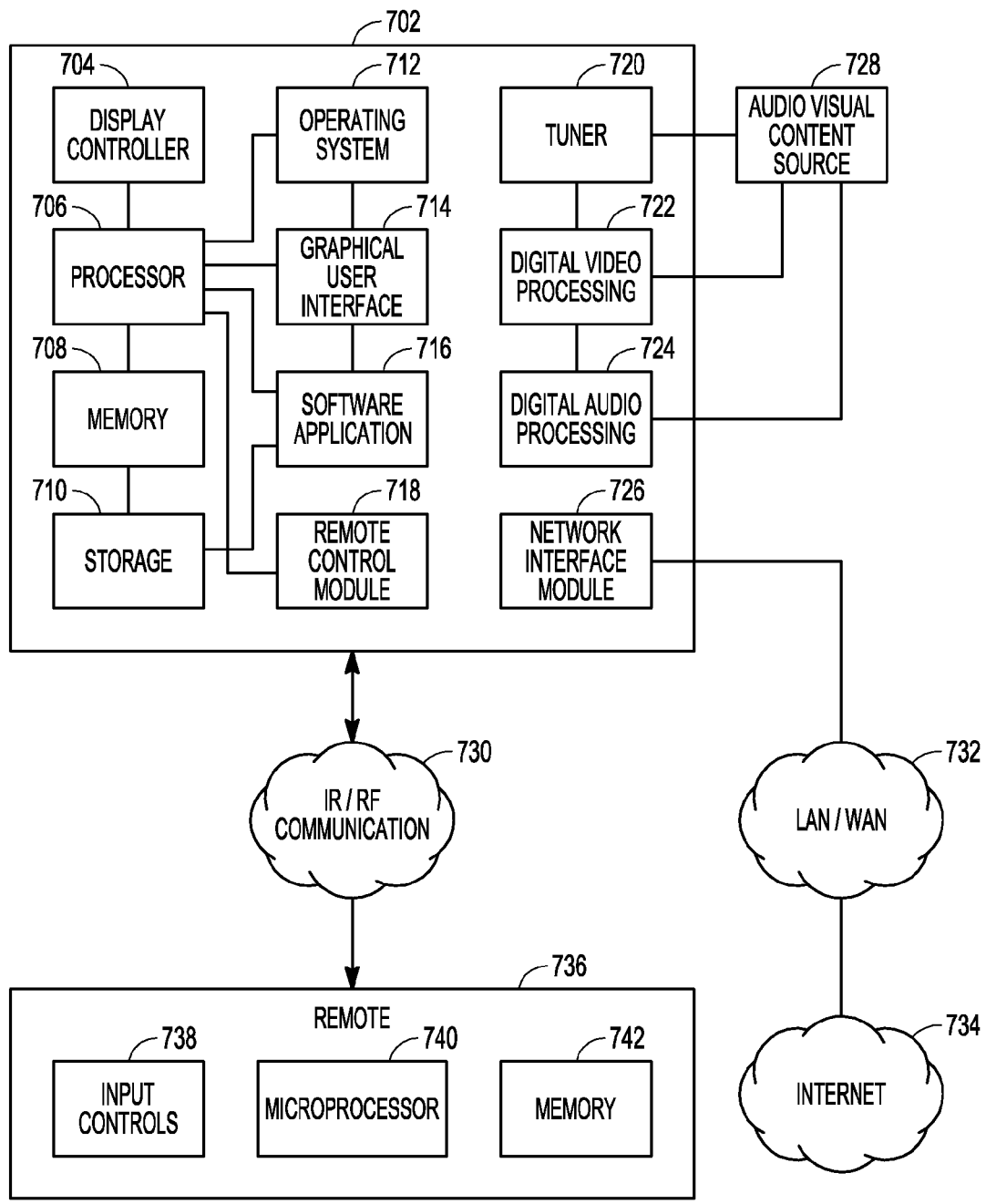
FIG. 7 illustrates a configuration of an electronic display device in accordance with an example further described herein.

FIG. 7 provides an illustration of a block diagram for an example architecture for operation with a display device 702, configured for implementing the example techniques described herein. In some examples, the display device 702 may include an output screen (not shown) such as a liquid crystal display (LCD), light-emitting diode (LED) display, organic light-emitting diode (OLED) display, cathode ray tube display, plasma display panel, or digital light processing (DLP) display, to directly provide an audiovisual output. In some examples, the display device 702 may include functionality to directly receive user input with use of the output screen, such as with use of a touch screen input mechanism, or the display device 702 may receive user input in connection with other input processing components such as a video camera and video processing system configured to perform gesture-based detection and movement.

As shown, the display device 702 is coupled to one or more of audiovisual content sources, accessed through an analog processing component such as a tuner, a digital video processing component, or a digital audio processing component. The display device 702 may also receive content using a network interface module, to establish a connection to receive content from the internet 734 via a local area network or wide area network connection 732. The network interface module, digital audio processing component, digital video processing component, and tuner may be operably coupled to enable processing of the various input content received from the respective source (and facilitate analog/digital conversion, processing of internet data, and the like).

The display device 702 is further configured to receive interaction with a remote 736 or other user input control via infrared (IR), radio frequency (RF), or similar wireless communication 730. The remote may include one or more input controls 738 such as designated pushbuttons to designate controls for input selection at the display device 702. The remote may also include a microprocessor 740 and memory 742 to provide the specific IR/RF code or codes and respond to user interactions with the display device 702. In some examples, the remote 736 may be provided from a simple single-feature device such as a handheld battery-powered remote control; in other examples, the remote 736 may be provided from a multi-feature device such as a smartphone or the like. The display device 702 is configured to receive the IR/RF wireless communication 730 at a remote control module 718 and provide control of device operations through use of the processor 706.

The operations of the display device 702 may be implemented through use of a display controller 704, processor 706, memory 708, and storage component 710. The processor 706 may be operably coupled to the display controller 704, the memory 708, and the storage component 710, to facilitate operations of an operating system 712, graphical user interface 714, and one or more software application(s) 716. For example, instructions for execution of the graphical user interface 714 and the software application(s) 716 may be provided in the storage component 710, loaded into the memory 708, and executed by the processor 706.

The operating system 712 may provide various functions and features to facilitate operation of the graphical user interface 714 and the various software application(s) 716, including the interface and applications to implement the input selection mechanisms and on-screen display configurations described herein. The operating system 712, graphical user interface 714, and software application(s) 716 may be configured for upgrading through either a local connection and commands (e.g., a universal serial bus (USB) port) or a remote connection and commands (e.g., an internet service) to obtain and deploy upgraded software.

Embodiments of the techniques and configurations may be implemented within a variety of systems and display devices, including televisions, monitors, projectors, and other video display screens, in addition to display devices without a screen or other direct video output. For example, the presently described on screen display may be implemented as an output of a multi-source video receiver configured to provide a single HDMI audiovisual signal to a second display device such as a television, monitor, or projector. Likewise, the presently described on screen display may be implemented as an output of a satellite receiver, a cable television receiver, a media player, a set top box, or other device which allows selection from multiple input sources (including multiple channels or streams of content). Other devices which provide a line-out or stream audiovisual signals may also be used in connection with the user interface techniques described herein. As used herein, audiovisual content refers to content including both audio and visual characteristics, as well as content providing exclusively audio characteristics or exclusively visual characteristics.

Embodiments may be implemented in connection with wired and wireless networks, across a variety of digital and mediums. Although some of the previously described techniques and configurations were provided with reference to implementations of consumer electronic devices with wired or physically coupled digital signal connections, these techniques and configurations may also be applicable to display of content from wireless digital sources from a variety of local area wireless multimedia networks and network content accesses using WLANs, WWANs, and wireless communication standards. Further, the previously described techniques and configurations are not limited to input sources provided from a direct analog or digital signal, but may be applied used with any number of multimedia streaming applications and protocols to provide display content over an input link.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer or other processor-driven display device). For example, a machine-readable storage device may include read-only memory (ROM), random-access memory (RAM), magnetic disk storage media, optical storage media, flash-memory devices, and other storage devices and media. In some embodiments, display devices such as televisions, A/V receivers, set-top boxes, and media players may include one or more processors and may be configured with instructions stored on such machine-readable storage devices.

What is claimed is:

1. A display device, comprising:
   a housing;
   multiple input receptacles exposed from at least a first side of the housing, the multiple input receptacles configured to receive video content from respective sources via physically coupled connections with the respective sources;
   a display screen exposed from a second side of the housing, the display screen configured to output video content;
   a processor; and
   a memory including instructions, which when executed by the processor, cause the processor to provide an interactive on-screen display via the display screen for selection of a particular input receptacle of the multiple input receptacles, with operations that:
   determine positioning, relative to the display screen, of respective physical locations of the multiple input receptacles on the housing;
   arrange respective selectable indications of the multiple input receptacles within the on-screen display according to a defined arrangement, the defined arrangement corresponding to the positioning of the respective physical locations of the multiple input receptacles on the housing;
   output the interactive on-screen display to the display screen, wherein a particular selectable indication of the respective selectable indications in the interactive on-screen display indicates a physically coupled connection with a particular source;
   receive selection of the particular source in the on-screen display using the particular selectable indication, the particular source connected via a particular input receptacle corresponding to the particular source; and
   output video content from the particular source received via the particular input receptacle to the display screen in response to receiving the selection of the particular source in the on-screen display.

2. The display device of claim 1, wherein the on-screen display is configured to receive the selection of the particular source in the on-screen display using an on-screen highlighted designation of one of the selectable indications of the multiple input receptacles, the selection of the particular source in the on-screen display configured to perform a command to output the video content received from the particular source via the particular input receptacle.

3. The display device of claim 2, wherein the video content received from the particular source is further output to a second display device operating independently of the display device.

4. The display device of claim 1, wherein the display screen includes a liquid crystal display panel, light emitting diode display panel, organic light emitting diode display panel, cathode ray tube, or plasma display panel.

5. The display device of claim 4, wherein the display device is a television, wherein the multiple input receptacles are located at respective positions on multiple sides of the housing, each of the multiple sides of the housing being opposite to the second side of the housing, and wherein the display device is configured to receive the selection of the particular source in the on-screen display from a command transmitted from a remote control in communication with the television.

6. The display device of claim 1, wherein the display device is configured to present the interactive on-screen display to indicate available input sources and active input sources of the multiple input receptacles in response to a user selection of an input selection mode.

7. The display device of claim 1, wherein the display device is configured to determine the positioning of the respective physical locations of the multiple input receptacles relative to the display screen using a mapping, and generate a setup mode for setup of the interactive on-screen display.

8. A method performed by an electronic device for facilitating an audiovisual input selection, the method comprising operations performed by hardware of the electronic device that provides an interactive on-screen display for output to the electronic device, the operations including:
  determining positioning, relative to an output of the on-screen display by the electronic device, of a physical location of a particular input receptacle on a housing of the electronic device, the particular input receptacle to receive audiovisual content from a particular input source;
  arranging a particular selectable indication of the particular input receptacle within the on-screen display according to a defined arrangement, the defined arrangement corresponding to the positioning of respective physical locations of multiple input receptacles on the housing of the electronic device, the multiple input receptacles including the particular input receptacle;
  outputting the interactive on-screen display, wherein the particular selectable indication in the interactive on-screen display indicates a physically coupled connection with the particular input source;
  receiving selection of the particular input source in the on-screen display using the particular selectable indication, the particular input source connected via the particular input receptacle that corresponds to the particular input source; and
  outputting audiovisual content from the particular input source received via the particular input receptacle in response to receiving the selection of the particular input source in the on-screen display.

9. The method of claim 8, wherein the on-screen display is generated as a picture-in-picture or overlay of audiovisual content received from the particular input source over content from a second input source.

10. The method of claim 8, wherein the on-screen display includes an indication of an active status or an inactive status for the particular input source.

11. The method of claim 8, wherein the particular selectable indication in the interactive on-screen display includes a display of a name of the particular input source.

12. The method of claim 8, wherein determining positioning of the physical location of the particular input receptacle includes correlating the particular input receptacle to a mapping of the physical location of the particular input receptacle on the housing of the electronic device.

13. The method of claim 8, comprising:
  displaying a setup interface to designate an on-screen location and an on-screen identifier of the particular input source; and
  receiving, in the setup interface from a command issued by a human user, a designation of the on-screen location and the on-screen identifier of the particular input source, the on-screen location used as the location of the indication for selection of the particular input source within the on-screen display.

14. The method of claim 8, wherein the electronic device is connected to an audiovisual source device via an HDMI cable connection to the particular input receptacle of the particular input source, wherein the method comprises obtaining a device identifier of the audiovisual source device via a HDMI Consumer Electronics Control (CEC) data transfer, and wherein control of the audiovisual source device is performed over the HDMI CEC data transfer.

15. A system, comprising:
  a display device including a memory and processor, the display device using the memory and the processor to generate an on-screen display overlaid on audiovisual content received from an audiovisual content source device via an input source, the on-screen display configured for selection of the input source to output the audiovisual content;
  wherein the processor of the display device executes instructions that cause the processor to provide an interactive on-screen display for the selection of the input source from among multiple input sources, with operations that:
  determine positioning, relative to an output of the on-screen display by the display device, of a physical location of a particular input receptacle on a housing of the display device, the particular input receptacle to receive audiovisual content from a particular input source;
  arrange a particular selectable indication of the particular input receptacle within the on-screen display according to a defined arrangement, the defined arrangement corresponding to the positioning of the respective physical locations of multiple input receptacles on the housing of the display device, the multiple input receptacles including the particular input receptacle;
  output the interactive on-screen display, wherein the particular selectable indication in the interactive on-screen display indicates a physically coupled connection with a particular input source;
  receive selection of the particular input source in the on-screen display using the particular selectable indication, the particular input source connected via the particular input receptacle that corresponds to the particular input source; and output audiovisual content from the particular input source received via the particular input receptacle in response to receiving the selection of the particular input source in the on-screen display.

16. The system of claim 15, comprising:
the audiovisual content source device configured to output the audiovisual content for display to the display device via the particular input source.

17. The system of claim 16, wherein the audiovisual content source device is an audio player, video player, digital video disc (DVD) player, Blu-ray player, set top box, cable box, internet streaming video box, video game console, computing device, or media playback storage medium.

18. The system of claim 15, wherein the position of the physical location of the particular input receptacle is determined using a mapping of the physical location of the particular input receptacle on the display device.

19. The system of claim 15, wherein the on-screen display is configured to receive the selection of the particular input source in the on-screen display using an on-screen highlighted designation of one of the selectable indications of the multiple input receptacles, the selection of the particular input source in the on-screen display configured to perform a command to output the video content from the particular input source received from the particular input source via the particular input receptacle.

20. The system of claim 15, wherein the display device is a television, wherein the multiple input receptacles are located at respective positions on multiple sides of a housing of the television, each of the multiple sides of the housing being opposite to a side of a display screen of the television, and wherein the display device is configured to receive the selection of the particular input source in the on-screen display from a command transmitted from a remote control in communication with the television.

\* \* \* \* \*